United States Patent
Farhan et al.

(10) Patent No.: US 10,311,224 B1
(45) Date of Patent: Jun. 4, 2019

(54) DIGITALLY SEALING EQUIPMENT FOR AUTHENTICATION OF COMPONENTS

(71) Applicant: Amazon Technologies, Inc., Seattle, WA (US)

(72) Inventors: Munif M. Farhan, Clyde Hill, WA (US); Jaime Ismael Rangel Martinez, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 251 days.

(21) Appl. No.: 15/467,896

(22) Filed: Mar. 23, 2017

(51) Int. Cl.
*G06F 21/44* (2013.01)
*H04L 9/32* (2006.01)
*G06F 21/73* (2013.01)
*G06F 21/64* (2013.01)

(52) U.S. Cl.
CPC .............. *G06F 21/44* (2013.01); *G06F 21/64* (2013.01); *G06F 21/73* (2013.01); *H04L 9/3236* (2013.01)

(58) Field of Classification Search
CPC .......... G06F 21/44; G06F 21/73; G06F 21/64; H04L 9/3236
See application file for complete search history.

(56) References Cited

U.S. PATENT DOCUMENTS

| | | | | |
|---|---|---|---|---|
| 9,980,140 B1* | 5/2018 | Spencer | ................ | G06F 21/629 |
| 2001/0044782 A1* | 11/2001 | Hughes | ................... | G06F 21/10 |
| | | | | 705/59 |
| 2002/0067264 A1* | 6/2002 | Soehnlen | ................ | B65D 5/42 |
| | | | | 340/572.1 |
| 2002/0104006 A1* | 8/2002 | Boate | ................. | H04L 63/0853 |
| | | | | 713/186 |
| 2002/0147918 A1* | 10/2002 | Osthoff | ................... | G06F 21/71 |
| | | | | 713/193 |
| 2003/0079132 A1* | 4/2003 | Bryant | ..................... | G06F 8/60 |
| | | | | 713/182 |
| 2004/0006692 A1* | 1/2004 | Honda | ................ | G06Q 20/401 |
| | | | | 713/157 |
| 2004/0133794 A1* | 7/2004 | Kocher | ........... | G11B 20/00086 |
| | | | | 713/193 |
| 2004/0177354 A1* | 9/2004 | Gunyakti | ............. | G06F 21/121 |
| | | | | 717/174 |
| 2005/0099292 A1* | 5/2005 | Sajkowsky | ............ | G06K 17/00 |
| | | | | 340/539.13 |
| 2005/0132189 A1* | 6/2005 | Katsube | ................. | G06F 21/31 |
| | | | | 713/168 |

(Continued)

*Primary Examiner* — Darren B Schwartz
(74) *Attorney, Agent, or Firm* — Klarquist Sparkman, LLP

(57) ABSTRACT

A digital seal of a current configuration of a rack can be generated to authenticate that rack components within the rack remain unchanged during transport. At a manufacturing site, an agent can be executed so as to capture a plurality of device identifiers, which indicate what hardware or software components are present in the rack. A digital seal representing a current configuration of the rack can be generated using the device identifiers and stored at a secure location within the rack. When the rack is transported from one location to another, the digital seal of the rack travels with the rack. At a data center, the rack can be re-tested and a new measurement can be captured. The stored digital seal can be compared to the new measurement to ensure that the rack components have not been compromised during shipping.

18 Claims, 10 Drawing Sheets

(56) References Cited

U.S. PATENT DOCUMENTS

| | | | |
|---|---|---|---|
| 2005/0218209 A1* | 10/2005 | Heilper | G06Q 30/06 235/380 |
| 2005/0259818 A1* | 11/2005 | Silverbrook | G06Q 10/087 380/55 |
| 2006/0010503 A1* | 1/2006 | Inoue | G06K 7/0008 726/30 |
| 2006/0055552 A1* | 3/2006 | Chung | B60R 25/00 340/686.1 |
| 2006/0181397 A1* | 8/2006 | Limbachiya | G06K 17/00 340/10.51 |
| 2007/0256125 A1* | 11/2007 | Chen | G06F 21/33 726/18 |
| 2008/0024268 A1* | 1/2008 | Wong | G06F 21/72 340/5.8 |
| 2008/0134309 A1* | 6/2008 | Qin | G06F 21/105 726/6 |
| 2008/0222430 A1* | 9/2008 | Buscaglia | G06F 21/86 713/194 |
| 2009/0204806 A1* | 8/2009 | Kanemura | G06F 21/10 713/155 |
| 2010/0024001 A1* | 1/2010 | Campbell | G06F 21/71 726/2 |
| 2010/0289627 A1* | 11/2010 | McAllister | G06Q 10/087 340/10.42 |
| 2011/0010770 A1* | 1/2011 | Smith | G06F 21/71 726/18 |
| 2011/0072266 A1* | 3/2011 | Takayama | G06F 21/445 713/169 |
| 2011/0113235 A1* | 5/2011 | Erickson | G06F 21/34 713/152 |
| 2012/0124388 A1* | 5/2012 | Chng | G06F 21/88 713/189 |
| 2012/0246470 A1* | 9/2012 | Nicolson | G06F 21/51 713/158 |
| 2012/0290841 A1* | 11/2012 | Jentzsch | G06F 7/582 713/168 |
| 2013/0028411 A1* | 1/2013 | Arkko | H04L 9/0833 380/28 |
| 2013/0086652 A1* | 4/2013 | Kavantzas | G06F 21/335 726/5 |
| 2014/0006738 A1* | 1/2014 | Nagai | G06F 21/44 711/163 |
| 2014/0032910 A1* | 1/2014 | Nagai | H04L 9/0844 713/171 |
| 2014/0164779 A1* | 6/2014 | Hartley | H04L 9/0866 713/176 |
| 2014/0211984 A1* | 7/2014 | Calio | G06Q 10/087 382/103 |
| 2014/0298034 A1* | 10/2014 | Watanabe | H04L 9/3236 713/176 |
| 2014/0304808 A1* | 10/2014 | Martini | G06F 21/44 726/19 |
| 2015/0180847 A1* | 6/2015 | Nix | H04L 9/0869 713/168 |
| 2015/0186677 A1* | 7/2015 | Sankar | G06F 21/71 726/34 |
| 2015/0199204 A1* | 7/2015 | Bieswanger | G06F 8/654 713/189 |
| 2015/0222632 A1* | 8/2015 | Ichijo | H04L 63/0876 726/7 |
| 2015/0269497 A1* | 9/2015 | Barnett | H04L 63/0876 705/51 |
| 2015/0271150 A1* | 9/2015 | Barnett | H04L 63/0435 713/171 |
| 2015/0317473 A1* | 11/2015 | Lim | G06F 21/445 726/16 |
| 2015/0317475 A1* | 11/2015 | Aguayo Gonzalez | G06F 21/55 726/23 |
| 2015/0381368 A1* | 12/2015 | Stevens, Jr. | G06Q 30/04 705/40 |
| 2016/0239934 A1* | 8/2016 | Soborski | G06T 1/0042 |
| 2017/0177883 A1* | 6/2017 | Paterra | G06F 21/606 |
| 2017/0329783 A1* | 11/2017 | Singh | G06F 17/3033 |
| 2018/0247081 A1* | 8/2018 | Helsel | G06F 21/44 |
| 2018/0260566 A1* | 9/2018 | Chaganti | G06F 21/57 |
| 2018/0268360 A1* | 9/2018 | Millhouse | G06Q 10/0833 |

* cited by examiner

DIGITALLY SEALING EQUIPMENT FOR AUTHENTICATION OF COMPONENTS

BACKGROUND

A rack is a cabinet used for mounting multiple electronic devices. Often called "server racks", the racks house multiple server computers or blades, but can also include other electronic devices such as switches, storage, routers, telecommunication hardware, power supplies, cable managers, patch panels, etc. The racks are useful to organize the electronic devices and include vertical mounting rails and supporting framework made of steel or aluminum into which the electronic devices slide. The electronic devices that slide into the rack and that are mounted therein are called rack components. The racks are typically used in data centers and allow administrators to store, power, cool and manage the electronic devices in an efficient manner.

Rack purchases can be made from manufacturers, such as Original Design Manufacturers (ODM) or Original Equipment Manufacturers (OEM). At least in the case of ODMs, the entire rack can include the electronic devices already assembled and ready to ship to the data center. However, shipment to the data center can result in the rack being sent through multiple distribution hubs wherein security levels are unknown. A malicious actor can add, remove, or modify the electronic devices or components (e.g., chips) within those electronic devices as the rack moves from the manufacturer to the data center.

Therefore, it can be desirable to provide an automated check whether the rack configuration is authentic and has not been tampered with during the shipment, storage, and deployment within a data center. Additionally, it can be desirable to periodically re-check to ensure the rack remains in a known configuration.

DETAILED DESCRIPTION

Figure 1:
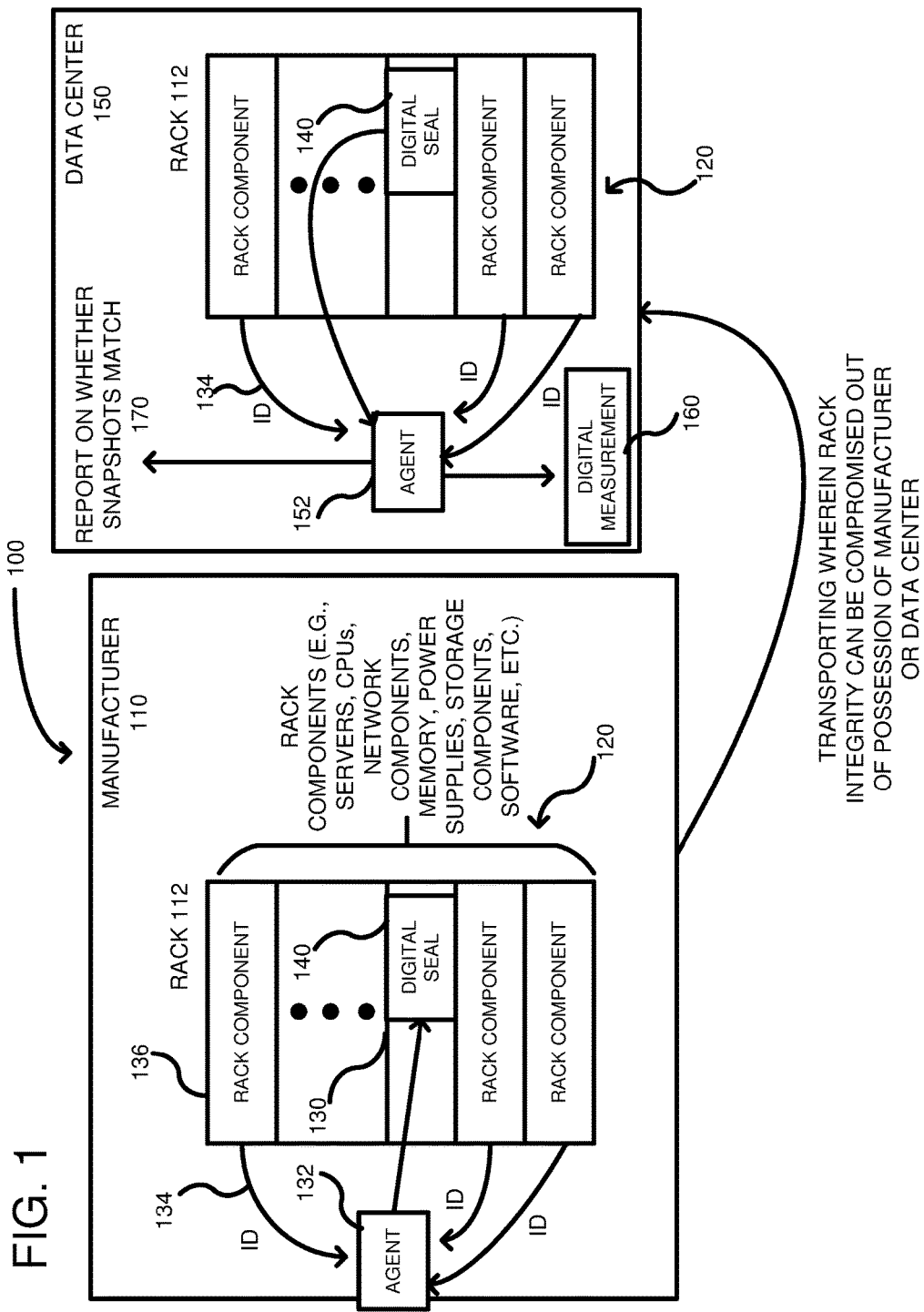
FIG. 1 is an embodiment for digitally sealing a rack and authentication of rack components.

A digital seal of a current configuration of a rack can be generated to authenticate that rack components within the rack remain unchanged during a given time period, for example, during transport of the rack. Rack components are electronic devices and can include one or more of the following: server computers, switches, power units, networking devices, add-in cards (e.g., PCI devices), etc. The current configuration is associated with the hardware components that are present on the rack components within the rack. At a manufacturing site, an agent can be executed so as to capture a plurality of device identifiers, which indicate what hardware components are present in the rack. A digital seal representing a current configuration of the rack can be generated using the device identifiers and can be stored at a secure location within the rack. When the rack is transported from one location to another, the digital seal of the rack travels with the rack. At a data center, the rack can be re-tested and a new digital measurement (also called a digital snapshot) can be captured. The stored digital seal can be compared to the new measurement to ensure that the rack components have not been compromised during shipping. Additionally, new digital measurement can be captured at any time to re-confirm that the rack has its original configuration. Any modifications, removals or additions of hardware components will result in a modified digital measurement, which can be detected.

Data centers are often associated with cloud computing environments. Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Security is a primary tenant of a cloud environment. One example security component is a supply chain and parts entering the cloud environment through the supply chain. For example, rack configurations can be authenticated so as to ensure that they have not been tampered with during the shipment, storage and deployment of the rack configurations at data centers within the cloud environment. Some examples of such tampering include replacing hardware components with counterfeit parts, adding malicious hardware devices to attack a data center or leak data once the rack is deployed, and introducing firmware images with malicious code that can be used to compromise servers.

A digital seal of the rack can be generated. The digital seal can include a unique identifier (called a configuration ID) that is a concatenation of a plurality of identifiers retrieved from components on the rack. The components can include hardware (CPUs, memory, FPGAs, add-in cards, etc.), or software (firmware, drivers, kernel, applications, etc.). The identifiers of the components can include one or more of the following: a class or type of device (e.g., CPU, memory, etc.), a manufacturer, a model number, a version number, a date, a serial number, a release version of software, etc. Other identifiers can also be used. For example, if the rack component runs firmware, such as Solid State Drives (SSDs), Redundant Array of Inexpensive Disks (RAID) controllers, PCIe, Network Interface Controller (NIC) controller, etc., then the version or release associated with the firmware can be part of the configuration ID. The concatenation can be a string that has been processed by an algorithm, such as a hashing function, an encryption algorithm, or a checksum. During a survey and discover phase, one or more software agents can interrogate rack components and discover existing hardware and software within the rack. The hardware can include, but is not limited to, one or more processors, memory, network, storage, management cards, host bus adaptors, power supplies, etc. Additionally, the hardware can include any Integrated Circuit (IC) that is located within the rack component. In one embodiment, a management software agent executes on one of the rack components and gathers identifiers from its own rack component as well as other rack components within the rack. For example, the software agent can execute on a processor and can communicate with other agents executing locally on other rack components and query those other agents for local hardware. Alternatively, the management software agent can communicate through one or more Baseboard Management Controllers (BMCs) on the rack components.

Various protocols can be used for communication. For example, an Application Program Interface (API) or an Intelligent Platform Management Interface (IPMI) can be used. Other interfaces can also be used, if desired. Communications between rack components can be established much like other web services in a cloud environment. A web service is a software function provided at a network address over the web or the cloud. Servers initiate web service requests to other servers and servers process the requests and return appropriate responses. The web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format, or another format. The API can specify a set of functions or routines that perform an action, which includes accomplishing a specific task or allowing interaction with a software component. When a web service receives the API request from another device, the web service can generate a response to the request and send the response to the endpoint identified in the request.

Once all of the desired identifiers have been obtained by the software agent, the agent can generate a digital seal. This seal can be a cryptographic value, such as a hash value, produced from the concatenation of every device's identifier. Other algorithms for creating the seal can also be used. In any case, the digital seal is a digital seal for the initial component's digital seal can be used to generate a single digital seal for the entire rack.

During a "bind and commit" phase, a survey is made of the platform root of trust components. For example, a Trusted Platform Module (TPM) or other trusted component can generate a unique configuration identifier. The configuration ID captures the rack configuration based on the existing components at that moment in time. In this way, the configuration of the rack is sealed. The configuration ID can be stored in a component attached to the rack effectively binding the rack components to the rack. In one example, it can be stored in a trusted core of one of the rack components. The configuration ID can be stored in non-volatile memory within the rack, such that it is immutable and remains with the rack for the life of the rack. The configuration ID can be checked once or continuously monitored, as desired, for authenticity of the rack. The digital seal is said to be "broken" any time a new device is introduced to the configuration or a new device signature is discovered.

In a "seal and harden" phase, the identifier can be stored on each device attached to the rack to effectively "bind" the device to the rack (or associate the device with the rack). This identifier is the digital seal for the rack, and the digital seal can be continuously or intermittently monitored as desired for authenticity. The seal is broken any time a new device is introduced into the configuration or a new device signature is discovered. The rack seal can be compared to a known value that was generated at the initial configuration setup.

In a "monitor and comply" phase, the following can be performed. Once the rack is received at the datacenter, the configuration ID can be recalculated based on the current configuration, then compared to the stored configuration ID. The rack can be flagged as "dirty" if there are differences, meaning the currently calculated configuration ID does not match the stored configuration ID. Once the rack is in the datacenter, the device firmware can be programmed to check the configuration ID at device power up and the rack can be programmed to issue an error if a configuration ID does not match the configuration ID stored in the rack. Additionally, the seal can be monitored at various points (e.g., each point) of the shipment. The rack can be labeled as dirty if the measured value does not match the stored value. Finally, the device firmware can be programmed to check the identifier at power up and the devices in the rack can be programmed to issue an error if the identifier does not match the stored identifier.

An example table associated with the device identifiers is as follows:

| Device | Class | Vendor | Model | FW Version | Checksum |
|---|---|---|---|---|---|
| 0 | CPU | Intel | i5-7500 | 1.1.121007 | 56854210 |
| 1 | PCIe | Nvidia | GPU3k0 | NA | 98657419 |
| 2 | Memory | Kingston | NV8Gb | NA | 10203321 |
| ... | | | | | ... |
| N | | | | | ... |
| | | Digital Seal (Hash) | | | 516841321684165165153168 | configuration of the rack and works as a digital seal in the sense that in case a future runtime check does not match this value, the seal has been broken, such that the server has been modified in some way and actions need to be taken. In alternative embodiments, each rack component can have its own digital seal so that the rack has a plurality of digital seals, instead of just a single digital seal. However, each rack FIG. 1 is an example embodiment 100 illustrating generation of a digital seal and authentication of the digital seal used to digitally seal a rack. In the illustrated embodiment, a manufacturer (e.g., OEM or ODM) 110 assembles a rack 112, which is a container having top, bottom and side walls and which is sized to receive multiple rack components, shown generally at 120. The rack components 120 can be a mix of multiple different hardware components, such as servers, blades, power supplies, storage components, management cards, bus adapters, add-in cards (e.g., PCI devices), etc., that slide into the rack and are mounted therein. One of the rack components 130 includes a processor (not shown) for executing an agent 132. The agent 132 can collect multiple device identifiers, such as is shown at 134, from the different rack components 130. The device identifiers can include multiple identifiers associated with components on each rack component, or each rack component can generate a single ID representative of all of the components thereon. For example, if rack component 136 is a blade, its ID 134 can include information as shown in the table above, plus other components on the blade. Alternatively, the ID 134 can be a simple hash of all the components on the blade 136. The particular design details can be implemented using multiple techniques. However, it is desirable that the process of calculating the seal is reproducible. Nonetheless, the particular ordering of calculating a current configuration need not be dependent on an order in which device identifiers are used in a function. Once the agent 132 acquires all of the device identifiers from the rack components 120, it calculates a digital seal 140. The seal can be considered a snapshot of a current state of configuration of the rack. It should be noted that there is trust that the rack components are providing correct information, and that the agent is correctly calculating the seal. Other entities, such as devices, components, communication channels, and agents are also trusted during the generation of the digital seal.

The seal 140 can be calculated by concatenating the device IDs and using the concatenation as input into a function, such as a hash function or other cryptographic function, or a checksum. Other functions can be used. The seal 140, therefore, represents a current configuration of the rack 112 as it was assembled at the manufacturer 110. In alternative embodiments, the concatenation need not be applied to a function, but can rather be stored as a simple string used in a later comparison. In whatever manner the seal is implemented, it represents a current configuration of the rack 112 so that any modifications to the rack can be detected. Typically, the seal 140 is a numerical string stored in non-volatile hardware, such as within a Trusted Platform Module (TPM), or other hardware such that the seal 140 is immutable. The agent 132 (which can be in BIOS or in the OS) can be provisioned with a key so that the TPM can be ensured that the seal 140 is authentic. In this way, the TPM receives the seal from a trusted agent using signature authentication.

After the seal 140 is generated, the manufacturer 110 ships or transports the rack 112 to a customer, such as a data center 150. An agent 152 (which can be the same agent 132 or a different agent) can read the seal 140 and use it to authenticate the rack 112 as being unaltered (unmodified) during transportation. In particular, the agent 152 can read the same identifiers from the rack components 120, such as identifier 134, and calculate a second measurement 160 using the same technique, for example, that was used to create the seal 140. The agent 152 can then compare the strings/numbers 140, 160 and make a determination whether the configuration of the rack 112 has been altered. For example, any change of a device identifier can change the measurement resulting in the seal and the measurement being different. The comparison can be accomplished using a simple string-type comparison wherein each digit is compared in order between the two strings. If desired, the agent 152 can then report 170 the results of the comparison to a different server computer (e.g., see rack configuration service 550 in FIG. 5 discussed below.

The agents 132, 152 can execute on one of the rack components 120 or can be positioned outside of the rack executing on a separate processor, such as on a separate server. Such an external agent can then communicate with the rack components 120 using APIs to gather the device identifiers. The agent 152 can be executed upon power on so as to authenticate the rack components as soon as the rack is powered on in the data center. Additionally, the agent 152 can respond to external APIs to periodically authenticate the rack components.

Figure 10:
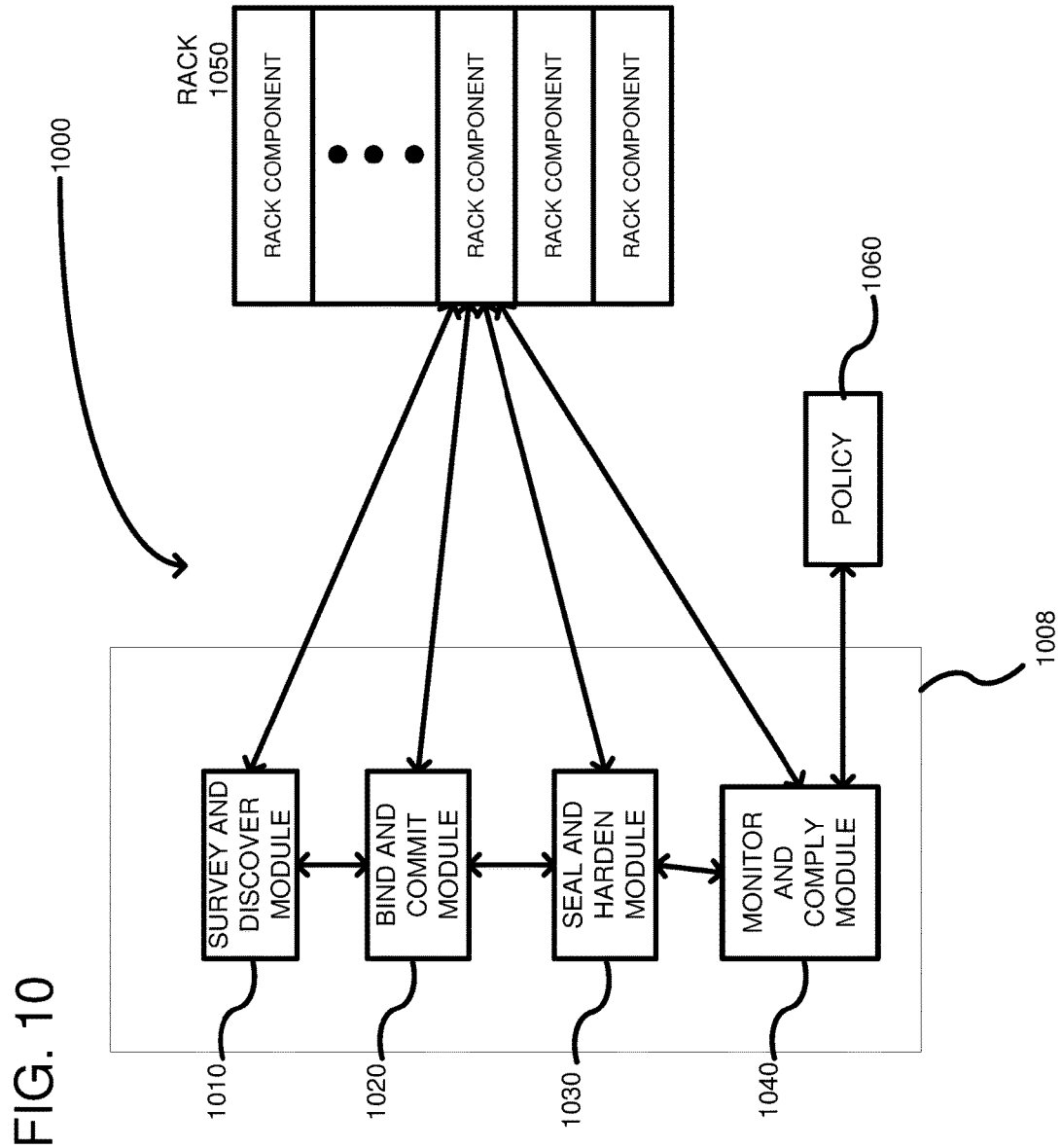
FIG. 10 is a system diagram showing a plurality of modules for digitally sealing a rack and ensuring that the rack components remain authentic.

Turning briefly to FIG. 10, a system diagram 1000 is shown with the various modules within one or more agents 1008 or one or more server computers for performing the above-described phases. The modules include a survey and discover module 1010, a bind and commit module 1020, a seal and harden module 1030, and a monitor and comply module 1040. The modules can communicate together and can be coupled to a rack 1050. The various modules can execute in different processors and different agents. For example, the survey and discover module 1010 can execute in an agent positioned on a server within the rack 1050, which is being digitally sealed, while the monitor and comply module 1040 can execute in a module external to the rack 1050. In some embodiments, all of the modules can execute within the rack and even on a same processor, if desired.

As described above, the survey and discover module 1010 can interrogate the rack components to determine what devices and what software are stored thereon. The hardware can include, but not limited to, one or more processors, memory, network, storage, management cards, host bus adaptors, add-in cards, power supplies, etc. Additionally, the hardware can include any Integrated Circuit (IC) that is located within the rack component. The software can include device drivers, agents, operating systems, applications, etc.

A digital seal can be generated for each rack component. For example, for a server computer, it can generate a digital seal representing hardware components and software that are on that server computer. The digital seal can be a hash value that represents a digital seal for an initial configuration of the server computer.

The bind and commit module 1020 can generate a unique identifier associated with the entire rack. A TPM can be used to generate the unique configuration ID that captures the configuration of the entire rack, which can include multiple server computers, switches, PCI devices, etc.

The seal and harden module 1030 can be used to secure the rack and reduce it from vulnerability. The unique identifier can be stored on any device to bind the device to the rack. For example, a storage unit on a server computer can receive the identifier and the storage unit can perform a check to ensure that it is being used on the correct rack. The identifier can be the same unique configuration ID generated by the TPM or a local identifier generated by each rack component. In any case, hardware and software on each rack component can authenticate that it is positioned or executing on the correct rack for which it was originally sealed.

Finally, the monitor and comply module 1040 can be used at any time to authenticate that the rack 1050 and the hardware and software thereon have not been tampered with since the rack was sealed. For example, once the rack 1050 is received in a datacenter, any of the identifiers, such as the unique configuration ID, can be recalculated and compared against the previously calculated unique configuration ID. If there is a match, then the rack has not been altered and is authenticated. If there is a mismatch, then the rack can be considered "dirty" and further checks can be made. For example, an error message can be transmitted to an administrator that can investigate which rack component and which hardware and/or software failed authentication. Routine periodic checks (based on policy) can be made to ensure the rack remains sealed and that the seal has not been broken (that the rack is unaltered from when the seal was calculated). The monitor and comply module 1040 can receive input from a policy document 1060, which can store a policy controlling how monitoring and compliance should be performed. For example, the policy can control how often checks are performed, and a level of detail of the compliance that is desired. For example, compliance can be only to check whether the unique configuration ID is still matched. Alternatively, compliance can require each individual server to perform checks of all of its devices. The policy can also control what actions to take if there is a match or mismatch. For example, in the event of a mismatch, alerts can be issued or the rack can be taken offline.

Figure 2:
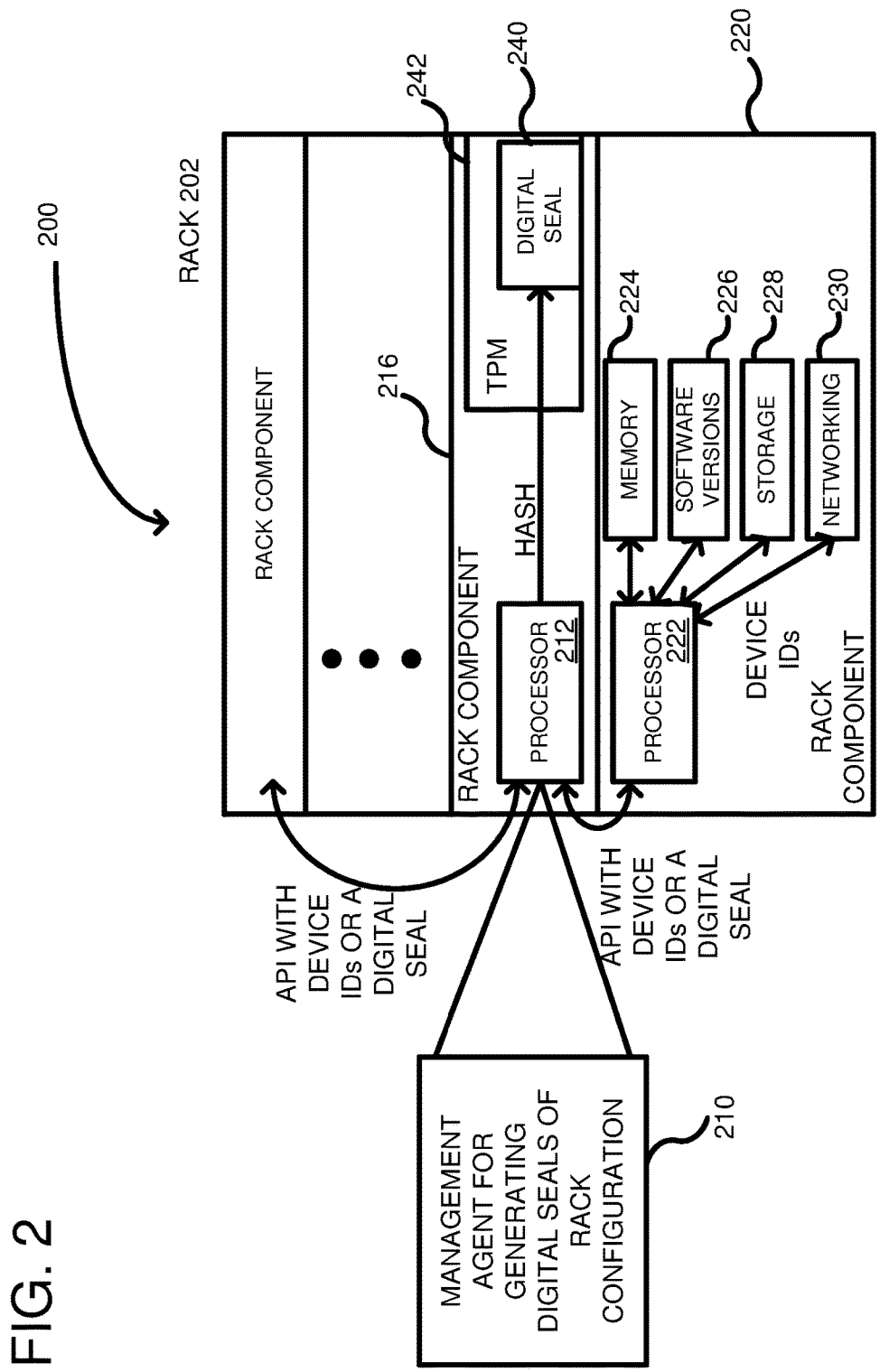
FIG. 2 provides further details of digitally sealing a rack.

FIG. 2 shows further details of an embodiment 200 showing a rack 202 and how the device identifiers can be gathered and transformed into a seal. An agent 210 can execute on a processor 212 positioned within a rack component 216. The agent 210 can transmit an API requesting device IDs, such as to a rack component 220. A processor 222 executing on rack component 220 can receive the API and retrieve device identifiers from other hardware components. For example, rack component 220 can include a memory 224, software 226 (executing on hardware), storage 228, and networking components 230. Some of these components, like memory 224, are passive components and others, like storage 228 are active components. The active components include some intelligence (e.g., a processor) to report hardware and firmware that are within it. In some cases an active component, like processor 222, includes multiple identifiers. For example, processor 222 can have an identifier for internal components (not shown) including, for example, a microcontroller, a power management controller, microcode, etc. The device identifiers can include a type (e.g., CPU), a manufacturer (e.g., Intel®), a model number, version number, a serial number, etc. Alternatively, each hardware component can have different identifiers combined in the form of a hash, checksum, etc. As a result, each rack component can generate a device identifier (also called a birth certificate) that is a concatenation of other identifiers local on the rack component. In either case, the processor 222 can concatenate the individual device identifiers into a rack-based device identifier, which is transmitted to the management agent 210. In the typical example, the rack-component-based device identifier can be a hash value indicative of the devices on the rack component. Thus, each rack component, such as rack component 220, can gather device identifiers and pass the identifiers to a more global agent to seal the entire rack. Alternatively, each rack component can be individually sealed and then the entire rack 202 can be sealed using the individual seals. In the alternative embodiment, processor 222 can collect the device identifiers and then seal the rack component 222.

The management agent 210 can combine the device identifiers in a number of ways, such as using a hash function on the device identifiers to generate a seal 240. Alternatively, the seal can be a string concatenation of all of the device identifiers, without any hash function or other algorithm performed thereon. Whatever method is used, the seal 240 can be stored in non-volatile memory, which can be immutable, such as is shown by TPM 242.

Figure 3:
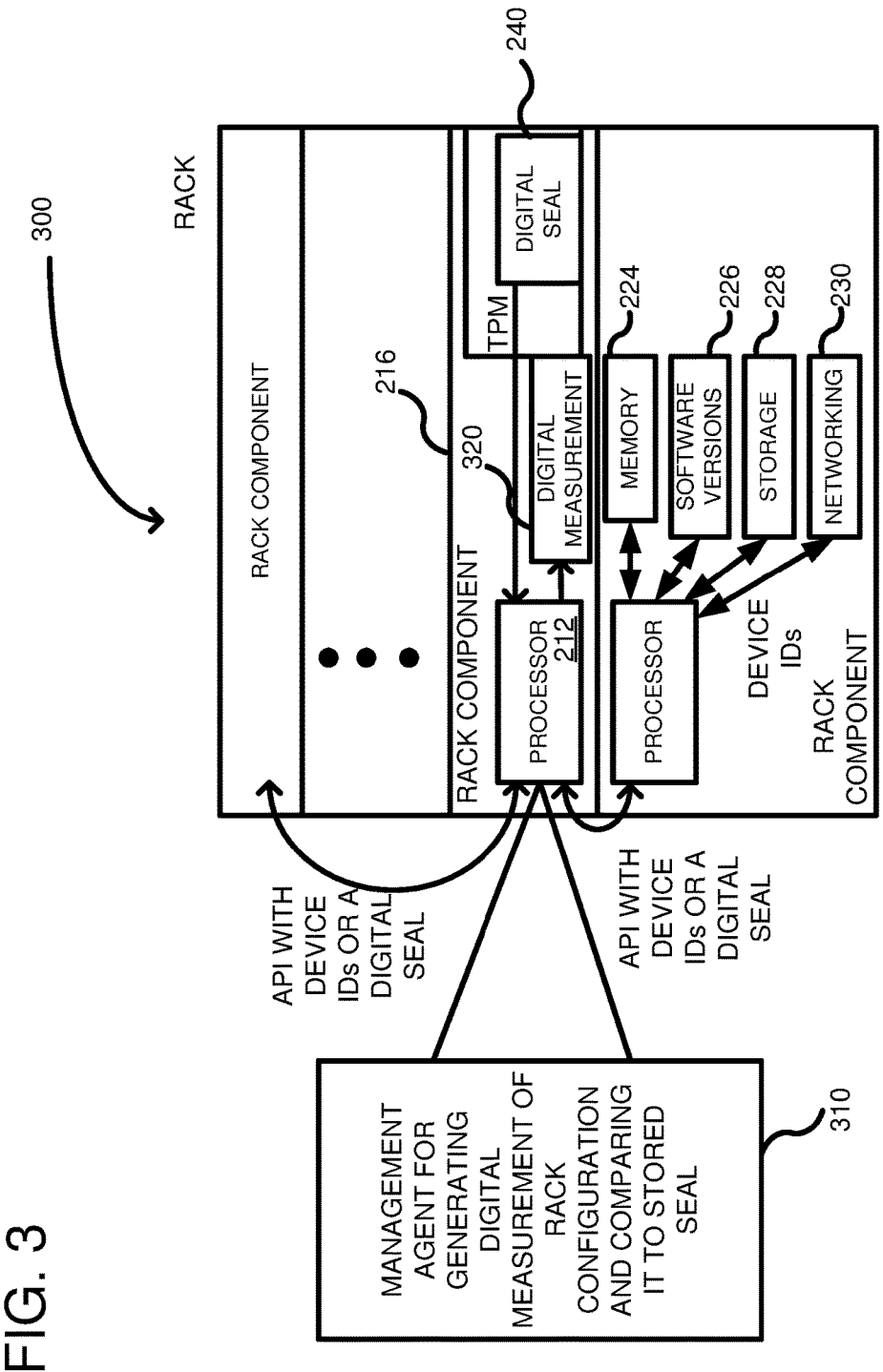
FIG. 3 provides further details of authenticating a rack configuration, including the rack components.

FIG. 3 shows further details of an embodiment 300, wherein an agent 310 reads the seal 240 and uses the seal 240 to authenticate the rack including all of the rack components. The agent 310 executes in processor 212 and requests device identifiers from the other rack components, as well as device identifiers from components within rack component 216. The agent 310 can use a same process to generate a digital measurement 320 as was used to generate the seal 240. In one example, the agent 310 can concatenate the device identifiers using a hash function to generate the measurement 320. A comparison can be made between the seal 240 and the measurement 320 using a simple string comparison. If the values 240, 320 do not match, then one of the rack components has been changed. For example, if memory 224 is swapped out for a different memory after the seal 240 was computed, then the measurement 320 will result in a different measurement that does not match the seal. In this way, the agent 310 can confirm down to the IC-level whether any rack components have been modified.

Figure 4:
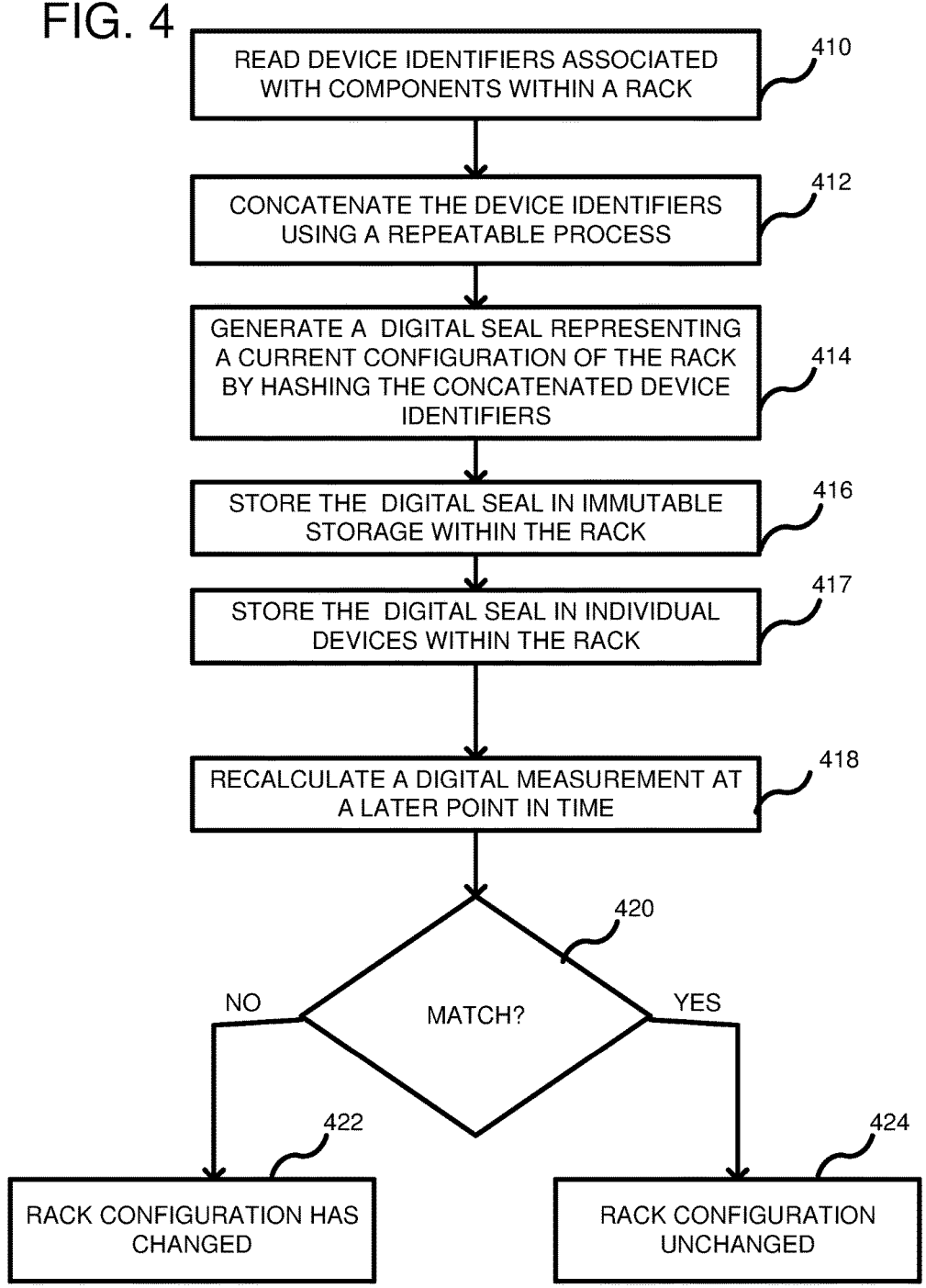
FIG. 4 is a flowchart of a method for digitally sealing a rack and authenticating the integrity of the rack components.

FIG. 4 is a flowchart of a method for authenticating rack components and can be performed by one or more agents executing on one or more processors. In process block 410, as part of a survey and discover phase, device identifiers are read associated with components within the rack. A component is a particular hardware comprising an IC or multiple ICs. A component can also include firmware (which is an example of software), in which case a version can be part of the device identifier. Example components include memory, processors, storage, network components, power, etc. Any ICs within the rack can be included and a device identifier can be generated for particular components. The device identifiers uniquely identify a component and can be a hash of information about the component. For example, the information can be a type, vendor, model, version, etc. Alternatively, the device identifier can be a simple alphanumeric or numeric string (e.g., CPU_Intel_157000_1.1.1210007).

In process block 412, the device identifiers can be concatenated using a repeatable process. For example, the agent can transform the device identifiers into a single string. In process block 414, a digital seal is generated using the device identifiers. In some embodiments the string can be used as the digital seal. In other embodiments, the single string can be transformed using a function, such as a hashing function, checksum, a cryptographic function, etc. The digital seal represents a current configuration (a current snapshot) of the rack including components within the rack.

In process 416, as a bind and commit phase, the digital seal is stored in immutable storage within the rack. A wide variety of immutable storage can be used, such as TPMs, read-only memory, etc. In process block 417, as part of a seal and harden phase, the digital seal can be stored in individual devices within the rack. For example, turning briefly to FIG. 2, processor 222 can store the digital seal (or some associated key) into storage 228 so that the storage can intelligently determine if it is located in the correct rack component. The storage 228 can check the key before unlocking and becoming operable. In process block 418, as part of a monitoring and compliance phase, at any desired point in time, a digital measurement or snapshot can be recalculated. Typically, the digital seal is generated when the rack is at the manufacturer and the measurement is generated when the rack is transported to a customer. The recalculation of the digital measurement can be performed in a same way as the digital seal. In process block 420, a check is made whether the digital seal matches the recalculated measurement. If yes, then in process block 424, the rack configuration is authenticated. If not, then the rack configuration has changed (process block 422). In either case, a report can be transmitted to a management server computer that oversees rack testing (see service 550 in FIG. 5).

Figure 5:
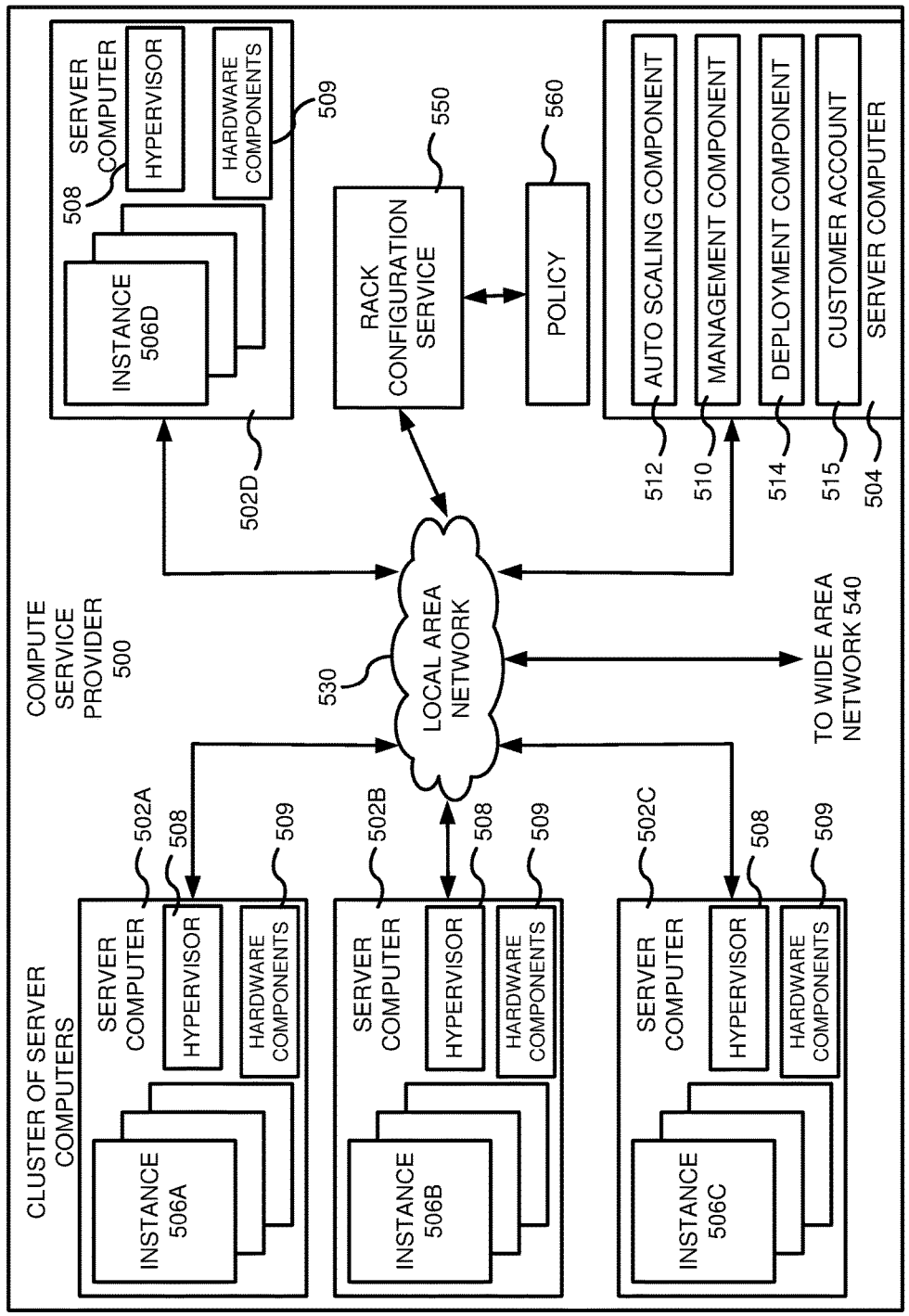
FIG. 5 is an example system diagram showing a plurality of virtual machine instances running in the multi-tenant environment with a rack configuration service that can interface with server computers within racks for management of configuration testing.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502 can be positioned within one or more racks. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. The agents, such as agents 132, 152, can execute within the instances 506. Alternatively, the agents can execute as part of the hypervisor. In either case, the agents can retrieve device identifiers from hardware 509 so as to identify hardware components executing on the server computers.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

A rack configuration service 550 can also function as the above-described agents to acquire device identifiers from the server computers 502 or other rack components. In one example, the server computers 502 can be all in a same rack and the rack configuration service 550 separately queries the servers for device identifiers so as to identify the hardware components 509 on the various server computers. In this way, the rack configuration service can monitor multiple racks in parallel. In addition, the rack configuration service 550 can periodically check authenticity of the racks using the methods described herein. In other embodiments, each server computer 502 is in a separate rack and the rack configuration service 550 performs a global enforcement and control of a fleet of racks. A policy 560 can be read by the rack configuration service 550 and control timing, frequency, and a level of detail for compliance checking (e.g., measure only critical components, measure all components, etc.). Additionally, the policy 560 can control actions to be taken by the rack configuration service 550. The rack configuration service can obtain a global view of the datacenter and run reports on racks that are non-compliant. Output log data can then be transmitted to other services (not shown).

Figure 6:
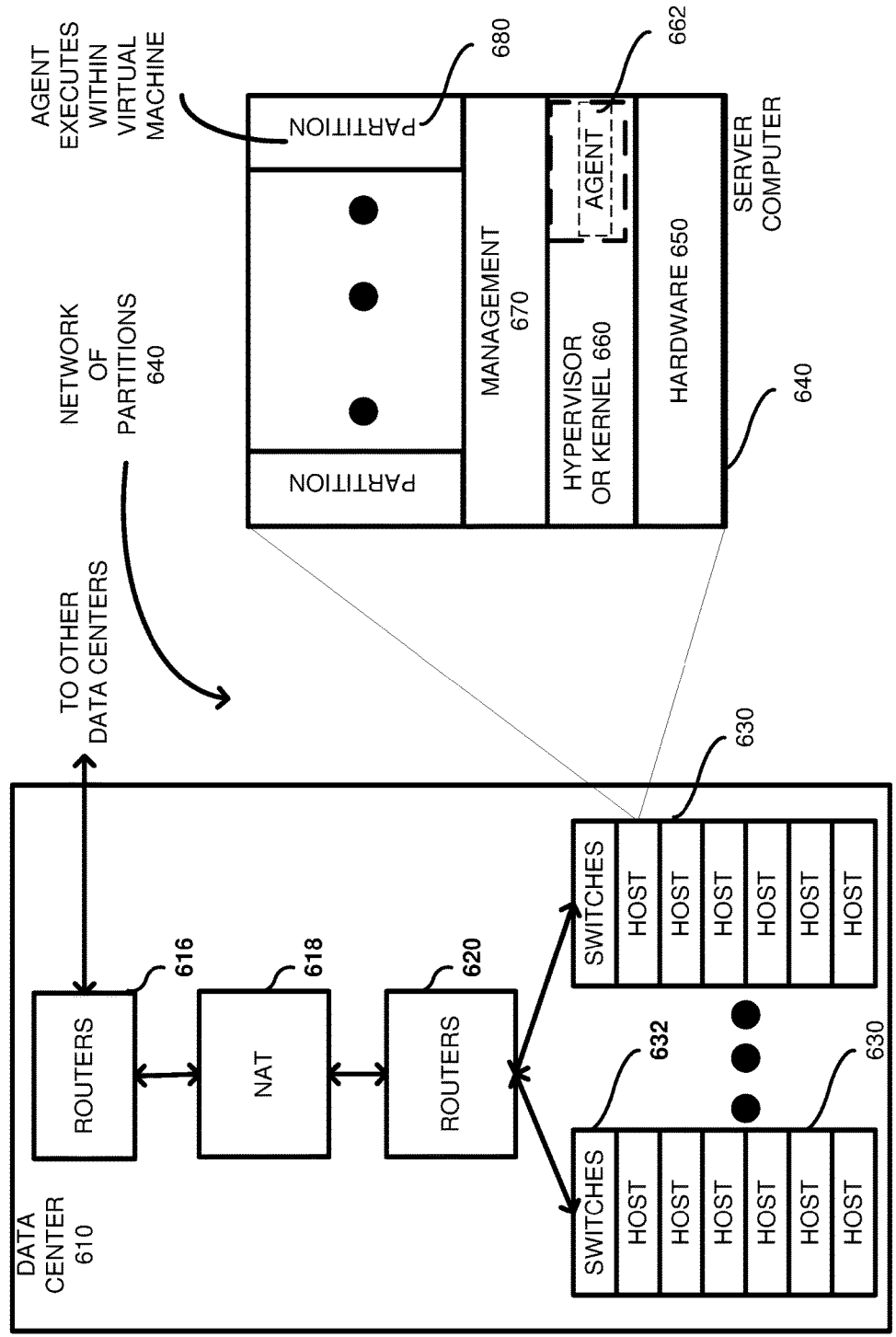
FIG. 6 shows an example of a plurality of host computers, routers and switches, with a local agent executing on the rack components to perform a discovery of rack components.

FIG. 6 illustrates a data center 610 and the physical hardware associated therewith. Multiple data centers can be coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. One or more agents 662 can execute either in the hypervisor or kernel, the management layer, or as a virtual machine in one of the partitions. In any event, the agent can obtain the device identifiers from the hardware layer 650 and perform the methods described herein.

Figure 7:
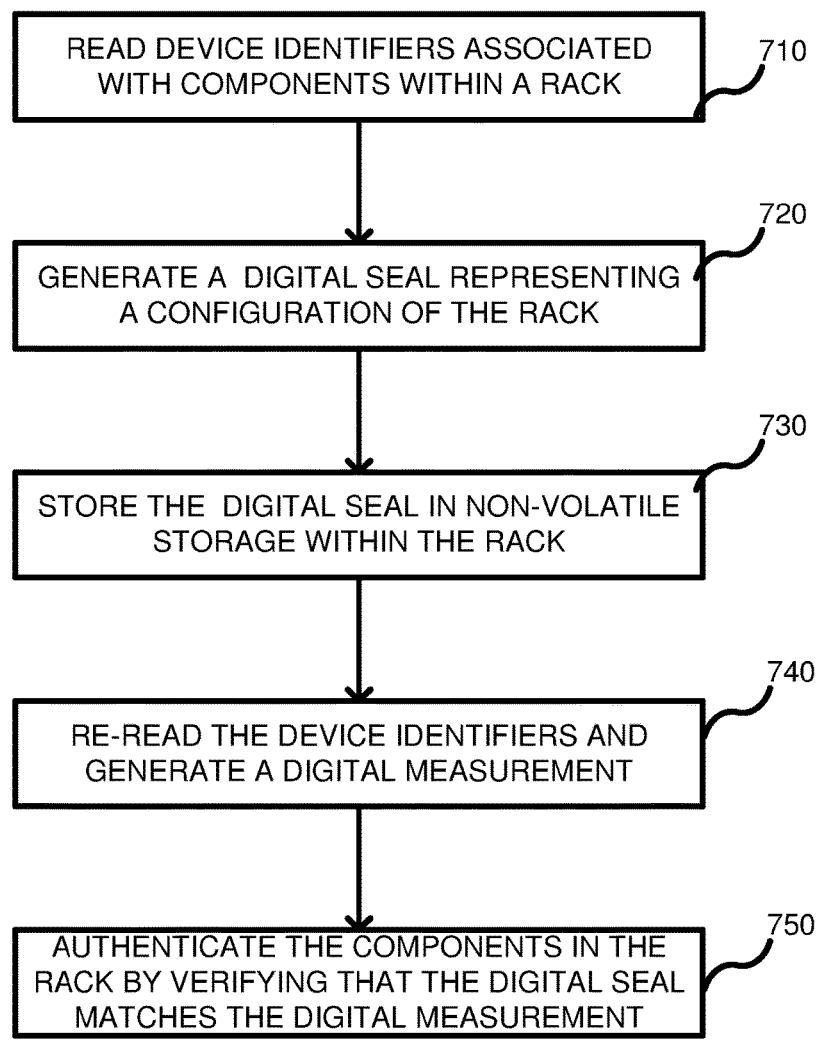
FIG. 7 is a flowchart of a method according to one embodiment for authenticating rack components.

FIG. 7 is a flowchart of an embodiment for authenticating rack components. In process block 710, device identifiers can be read that are associated with components in the rack. Typically, the device identifiers are for ICs, but can also be for hardware (e.g., storage unit) that is formed from a plurality of ICs. Reading of the device identifiers can be performed by a management agent that uses a protocol to communicate with other agents executing locally on separate rack components. In process block 720, a digital seal is generated representing a configuration of the entire rack including multiple rack components. The digital seal is a transformation of a plurality of device identifiers into a single string that can be used for comparison. Typically, the string is a hash value, and can be a hash value of other multiple hash values. In process block 730, the digital seal can be stored in non-volatile storage within the rack. Being in non-volatile storage allows the digital seal to travel with the rack. In a typical application, an ODM performs the method and stores the digital seal in a TPM so that it can travel with the rack. In process block 740, the agent re-reads the device identifiers and generates a measurement or snapshot. The measurement can be generated using a same algorithm for generation as the digital seal. Alternatively, other algorithms or measurements can be used. In process block 750, the components in the rack can be authenticated by verifying that the digital seal and the measurement match. The comparison can be accomplished by performing a string compare to determine that they are identical.

Figure 8:
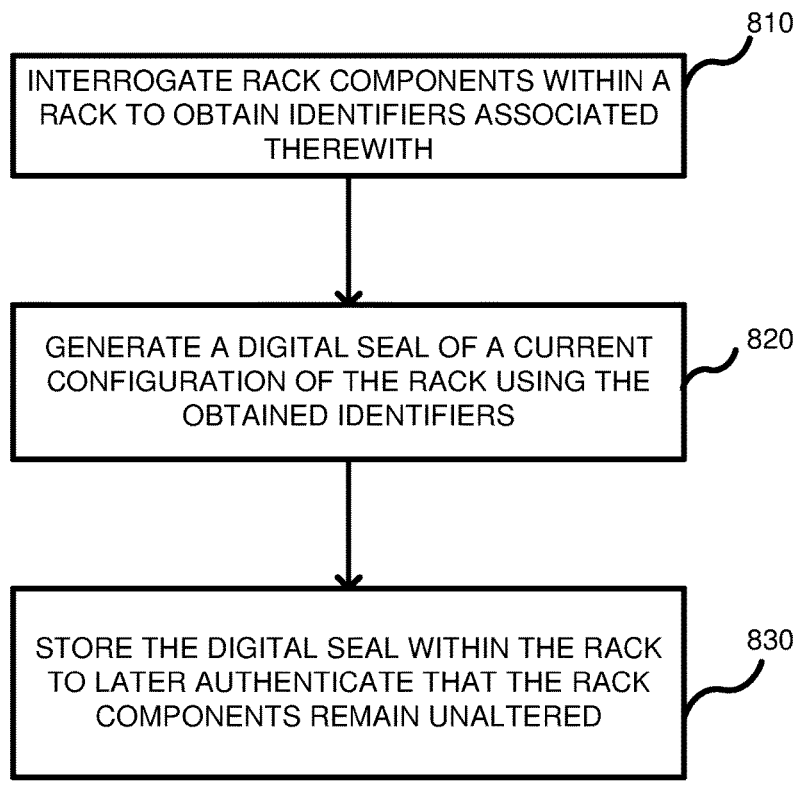
FIG. 8 is a flowchart of a method according to another embodiment for authenticating rack components.

FIG. 8 is a flowchart according to another embodiment for authenticating rack components. In process block 810, rack components can be interrogated to obtain identifiers associated therewith. Each rack component includes multiple hardware components and the identifiers can be used to establish a current configuration of each rack component. In process block 820, a digital seal is generated using the obtained identifiers. The digital seal represents a current configuration of the rack and is typically a single value. In process block 830, the digital seal is stored within the rack to later authenticate that the rack components remained unaltered. Storage within the rack can be within any of the rack components. For example, the digital seal can be stored within a TPM on a motherboard of a blade. However, other locations can be used.

Figure 9:
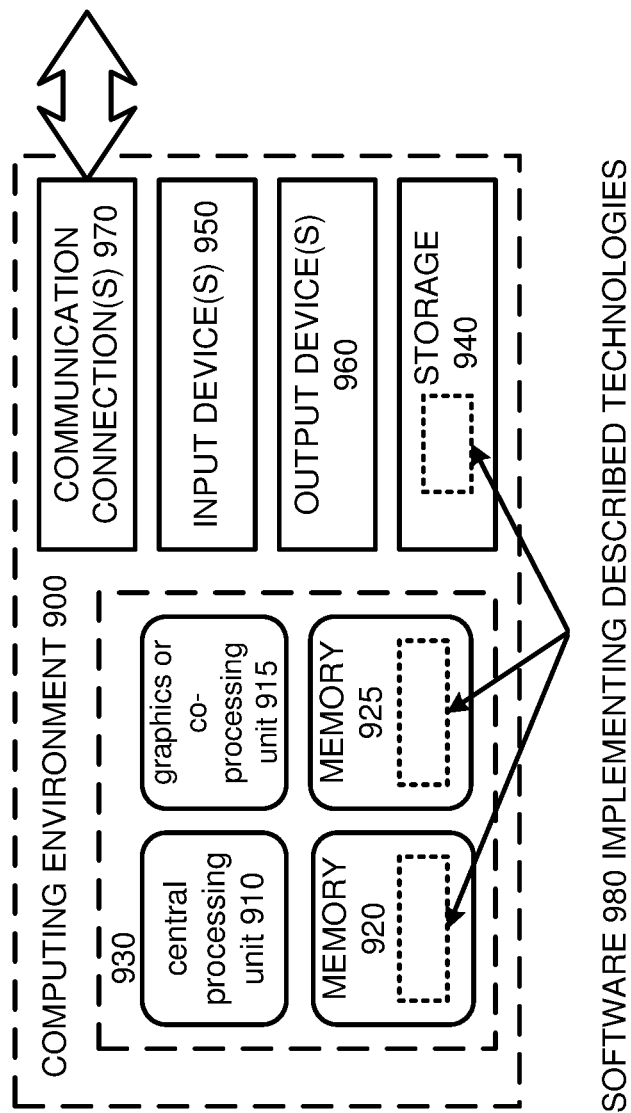
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.). The computing environment can be one of the rack components or a part of the rack configuration service 550.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of authenticating rack components, comprising:
    reading device identifiers for hardware components within a rack;

generating a digital seal representing a configuration of the rack using the device identifiers, wherein the digital seal includes a unique identifier that is a combination of the device identifiers;

storing the digital seal in non-volatile storage within the rack during shipment of the rack;

after shipment of the rack, re-reading the device identifiers and generating a current measurement; and authenticating the components within the rack by verifying that the digital seal matches the current measurement.

2. The method of claim 1, wherein the unique identifier is a concatenation of the device identifiers and wherein the device identifiers include serial numbers of the plurality of the components, or wherein the device identifiers are cryptographic values associated with the serial numbers of the plurality of components.

3. The method of claim 1, wherein the plurality of components include:
a processor, memory, storage devices, network devices, management cards, bus adapters, add-in cards, or power supplies.

4. The method of claim 1, further including interrogating the plurality of components in the rack to determine the device identifiers including: a type of component, a vendor of the component, a model number of the component or a version number of the component.

5. A method, comprising:
interrogating rack hardware components within a rack to obtain identifiers associated therewith;
generating, using a processor coupled to or in the rack, a digital seal of a current configuration of the rack using the obtained identifiers;
storing the digital seal using the processor within a Trusted Platform Module (TPM), the processor and the TPM being separate components within the rack; and
validating the rack by generating a digital measurement using the identifiers and comparing the digital measurement to the digital seal.

6. The method of claim 5, further including validating the rack at a later time by generating a digital measurement by using the identifiers and comparing the digital measurement to the digital seal.

7. The method of claim 6, wherein the digital seal matches the digital measurement if a configuration of the rack is unaltered between the generating of the digital seal and the generating of the digital measurement.

8. The method of claim 5, wherein rack components are electronic devices and include: server computers, switches, power units, PCI devices or networking devices.

9. The method of claim 5, wherein the interrogating of the rack components includes obtaining a vendor, a model, a serial number of the rack components, or a release version of software.

10. The method of claim 5, further including reading a policy document that controls a frequency to authenticate the rack and to control actions to be taken if the authentication is invalid.

11. The method of claim 5, wherein storing the digital seal includes storing a value within non-volatile memory within one of the rack components.

12. The method of claim 5, further including detecting that a rack component was added, removed, or swapped for another rack component by determining that the digital seal does not match a re-calculated digital measurement.

13. The method of claim 5, wherein the digital seal is generated using: a cryptographic function or a checksum.

14. A system, comprising:
a rack of components including a server computer, the server computers including a motherboard having a processor; and
an agent for execution on the rack of components to determine hardware components included in the rack of components after shipment of the rack of components, the agent for generating a first unique identifier for the determined components and for storing the unique identifier within the rack of components, wherein the first unique identifier is a concatenation of identifiers of the hardware components, and is configured to re-determine the hardware components included in the rack of components to generate a second unique identifier and to authenticate the rack of components by determining whether the second unique identifier and the first unique identifier match.

15. The system of claim 14, wherein the first unique identifier is associated with a configuration of the rack of components.

16. The system of claim 14, wherein the first unique identifier is obtained by reading identifiers of the components and using the identifiers of the components in a hash algorithm.

17. The system of claim 14, wherein the components include processors, network components, storage components, memory, add-in cards, or versions of software.

18. The system of claim 14, wherein the first unique identifier is stored with the rack of components in a trusted platform module.

* * * * *